United States Patent Office 3,045,782
Patented July 24, 1962

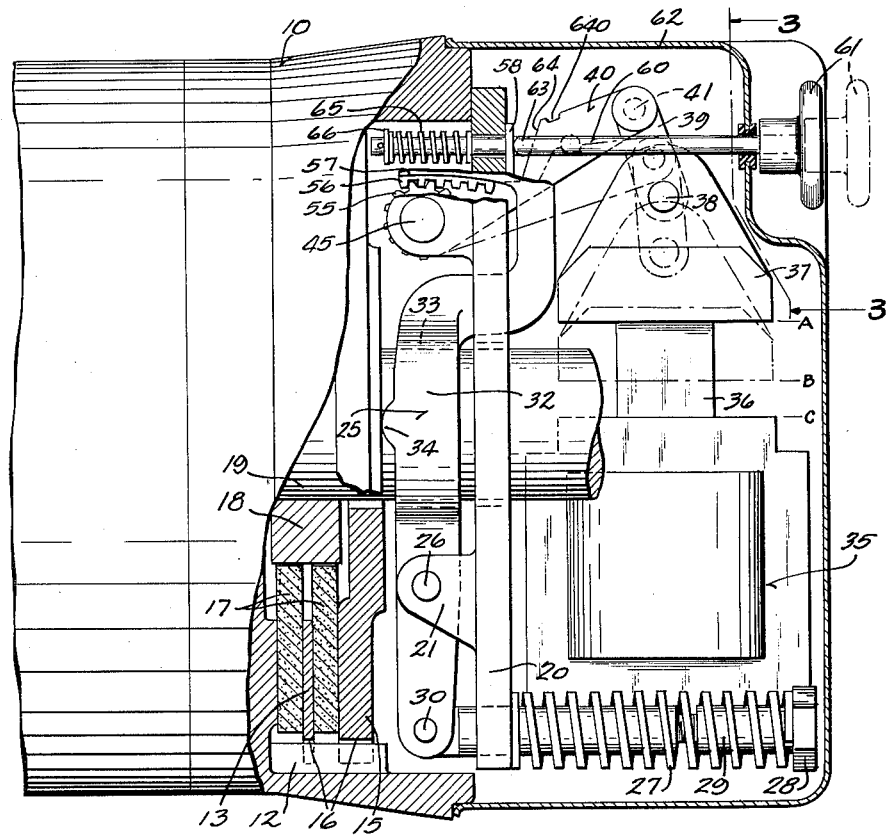
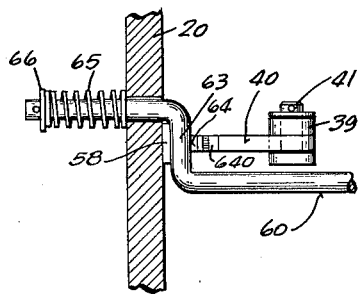
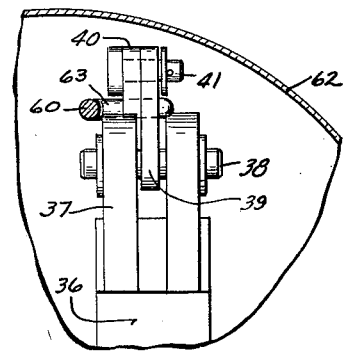

3,045,782
DETENT FOR RELEASABLY HOLDING AN ELECTROMAGNETIC BRAKE DISENGAGED
Quinten A. Hansen, Franksville, Wis., assignor to R. H. Stearns and R. N. Stearns, both of Milwaukee, Wis.
Filed Feb. 24, 1961, Ser. No. 91,514
6 Claims. (Cl. 188—171)

This invention relates to an improved detent for releasably holding an electromagnetic brake disengaged.

The invention is disclosed as applied to a brake of the structure shown in my copending application Ser. No. 51,437, filed August 23, 1960. The brake is applied to the armature shaft of an electric motor, being engaged by the spring and disengaged by the action of the solenoid which becomes effective when the motor is energized. The manual brake releasing mechanism of the present invention includes a pull rod having cam engagement with a solenoid-actuated lever to oscillate the lever in the same direction in which it is normally actuated by the solenoid. The lever is notched to receive the camming portion of the rod, thereby retaining the rod and lever in the position in which the brake is released. However, the next time the solenoid is operated, it produces additional movement of the armature beyond its brake releasing position, thereby retracting the lever from engagement with the camming portion of the rod and allowing the rod to spring back to its original position. Thus, the first energization of the solenoid restores the parts to normal automatic operation.

In the drawings:

FIG. 1 is a view partially in side elevation and partially in axial section through the brake housing, portions being broken away.

FIG. 2 is a fragmentary plan view of the detent rod and solenoid-actuated lever and portions of the mounting for the rod.

FIG. 3 is a fragmentary view taken in section on the line 3—3 of FIG. 1.

As explained in the companion application above identified, the brake shown is generally conventional. The mounting ring 10 is designed for application to the end of a motor. It is provided internally with ribs such as that shown at 12 with which the notches 16 of the brake disk 13 and brake pressure plate 15 are slidably and non-rotatably engaged. The intervening disk or disks 17, usually made of brake lining material, are mounted on a squared block 18 keyed to the motor armature shaft 19.

The mounting plate 20 has ears at 21 supporting pintle 26 for the brake operating lever 25. A compression spring 27 seated against mounting plate 20 and against the spring seat 28 on the spring-guided rotor link 29 transmits pressure through the link to the lever 25 with which the link is pivotally connected at 30.

The lever 25 has an intermediate portion 32 with an opening at 33 through which the armature shaft 19 may project if the shaft is long. The intermediate portion 32 of lever 25 has ribs 34 which bear against the compression plate 15 of the brake in a brake-applying direction subject to the pressure of spring 27.

For releasing the brake when the motor is energized to drive the armature shaft 19, a solenoid magnet 35 is provided. When this solenoid is energized, it draws the armature 36 downwardly. The armature head 37 has a pintle 38 upon which link 39 is pivoted. The link is pivotally connected to the rocker arm 40 by pivot bolt 41. Downward movement of the armature oscillates clockwise the tubular rotor 45. In the companion application, a special type of connection is described between the tubular rotor 45 and the pinion 55. However, for the present purpose, it suffices to note that the clockwise rotation of rotor 45 and pinion 55 acts through the segment 56 on the upper end 57 of the operating lever 25 to oscillate such lever clockwise upon its pintle 26 against the bias of spring 27, thereby relieving the brake plate of pressure, whereby the motor armature shaft will turn freely.

According to the present invention, the brake-releasing rocker arm 40 may be actuated manually and held in released position by a detent comprising a rod 60 provided externally of a shell 62 with a handle 61. This rod has an offset camming portion 63 engageable with a complementary cam surface 64 of the lever 40. The offset camming portion 63 of the rod lies immediately in front of the stop 58 which limits upward movement of rocker arm 40. Beyond the camming portion 63, the detent rod 60 continues through the mounting plate 20 and is provided with a spring seat washer 66 acted on by compression spring 65 in a direction to bias the rod 60 to the left as viewed in FIGS. 1 and 2.

If the detent rod 60 is moved to the right against the bias of spring 65, its offset camming portion 63 rides up the complementary surface 64 of arm 40. Upon reaching the top of such arm, the camming portion 63 of the rod will ride into the notch 640 and will be impositively retained therein, such arm being subject to upward bias through pinion 55 and segment 56 of lever 25, the lever being subject to the pressure of spring 27. The shallow notch 640 will not prevent the camming portion 63 of the detent rod 60 from being disengaged therefrom manually. Such disengagement can be effected simply by pressing on the exposed handle 61 at the end of the rod.

However, unless the rod is manually held in a brake-releasing position, it will automatically return to the normal position in which it is illustrated in FIG. 1 upon the first energization of the solenoid magnet 35. The reference character A in FIG. 1 shows the normal position of the armature head 37 when the brake is engaged. The dotted line designated at B shows the brake-disengaged position of the armature head 37 when the camming offset of the detent rod 60 is engaged in the notch 640 of the rocker arm 40. When the solenoid magnet 35 is energized, the armature head will move to its lowermost position as indicated at C in FIG. 1, thereby withdrawing the rocker arm 40 completely from engagement with camming portion 63 of the rod. The camming portion 63 now being released from the notch 640, the rod is free to move under bias of spring 65 to the position illustrated in FIG. 1, the brake now being restored to completely automatic operation.

I claim:

1. In a magnetically releasable brake structure, the combination with a brake-releasing arm and means for mounting it for pivotal movement to and from a brake-releasing position, of eletcromagnetic means for oscillating said arm to said brake-releasing position, manually operable means for oscillating said arm toward said brake-releasing position, means mounting the manually operable means for reciprocation in a direction generally longitudinal respecting the arm, said manually operable means and said arm having complementary cam surfaces whereby the arm is oscillated toward brake-releasing position upon reciprocation of the manually operable means in one direction, biasing means for actuating the manually operable means in a longitudinal direction opposite to that last mentioned, the said arm and said operable means having complementary detent portions constituting means effective when engaged for holding said arm in said brake-releasing position, said detent portions being disengageable upon the actuation of said electromagnetic means for the return reciprocation of said manually operable means by said biasing means.

2. In a magnetically releasable brake, the combination with a brake-releasing arm provided with a camming surface, of a rod reciprocable in a direction generally longitudinal respecting said arm and having camming means disposed transversely of said arm for engaging said surface for the actuation of said arm in a brake-releasing direction, electromagnetic means including an armature connected with said arm for the actuation thereof toward a brake-releasing position, said arm and rod having mutually engageable detent portions for restraining the rod in a position which said rod reaches when actuated to said brake-releasing position, said detent portions being disengageable automatically upon the actuation of said electromagnetic means, said rod having means biasing it longitudinally in opposition to said brake releasing direction when said detent portions are disengaged.

3. In a magnetically releasable brake structure, the combination with a pressure member having means for subjecting it to brake-engaging pressure, of an arm having means for relieving said member of said pressure, means for mounting the arm for pivotal movement between a brake-engaged position and a brake-released position, electromagnetic means having connection with said arm for actuation thereof toward the brake-released position, and a manually operable rod having means supporting it for reciprocation in a direction generally longitudinal respecting said arm, said rod having an offset portion extending transversely of the arm and said arm and the offset portion of the rod having complementary camming portions engageable in one direction of reciprocation of the rod for displacement of said arm toward its brake-released position, means biasing the rod for reciprocation in an opposite direction longitudinally of said arm to a retracted position in which said arm is relieved of camming pressure of said rod, said rod and arm having mutually interlocking detent means engageable in a given brake-released position of said arm for restraining said arm in said brake-released position.

4. The device of claim 3 in which said electromagnetic means is adapted, when energized, to advance said arm beyond said given position in which said detent means is effective, whereby to release said rod for movement to its retracted position subject to said biasing means.

5. The device of claim 3 in which said rod has portions at both sides of said arm, connected by said offset portion and said arm having an oblique margin constituting its said complementary camming portion, the detent means including a notched portion of said arm with which the said camming portion of said rod is engageable.

6. In a magnetically releasable structure, the combination with a lever arm having means mounting it for oscillation between terminal positions and through an intermediate position, of means biasing said lever arm toward one terminal position, electromagnetic means comprising an armature connected with said arm for the actuation thereof from said one position through said intermediate position to its other terminal position, and manually operable means for actuating said arm from said one terminal position to said intermediate position, said manually operable means comprising a rod extending generally longitudinally of said arm and having terminal portions at opposite sides of the arm provided with means supporting such portions for longitudinal reciprocation, said rod having an offset section connecting its said terminal portions across the rod and constituting a camming portion for which said arm has a complementary surface provided with a camming notch in which said camming portion is receivable in said intermediate position of said arm, the notched portion of said arm constituting a detent for restraining said manually operable means and for holding said arm in said intermediate position, the manually operable means having means for biasing it from engagement with the notched portion of said arm upon the release of its said camming portion from said notched portion of said arm, the release being effective automatically upon electromagnetic actuation of said arm beyond said intermediate position toward said other terminal position.

References Cited in the file of this patent
UNITED STATES PATENTS

| | | |
|---|---|---|
| 2,512,565 | Hallander | June 20, 1950 |
| 2,851,129 | Doerries | Sept. 9, 1958 |
| 2,964,137 | Luedtke | Dec. 13, 1960 |
| 2,974,756 | Roehm | Mar. 14, 1961 |